June 10, 1952     R. F. MITCHELL     2,599,652
LAYOUT OR HOLE LOCATING DEVICE
Filed Nov. 7, 1945

WITNESSES

INVENTOR
Reginald Fawn Mitchell

Patented June 10, 1952

2,599,652

UNITED STATES PATENT OFFICE 2,599,652

LAYOUT OR HOLE LOCATING DEVICE

Reginald Fawn Mitchell, Mount Vernon, N. Y.

Application November 7, 1945, Serial No. 627,150

8 Claims. (Cl. 33—189)

In precise mechanical work, one of the most important prerequisites for accuracy is laying out and locating holes. In well equipped shops this is usually accomplished by means of jig borers and similar devices. However, for shops not so equipped and for many other conditions, a simple and accurate Hole Locating Device is extremely useful. This invention describes a device with which it is possible to locate, and drill, holes with the speed and with the accuracy demanded in modern machine shops. It is customary, where a jig borer is not available, to mark a piece of work with cross lines to indicate the location of the desired holes. While this layout procedure may be very accurate, it is not easy to drill (or bore) holes with satisfactory accuracy without the aid of optical devices, of which several types are available. The use of such units involves time, and separate operations, layout and drilling, are necessary. The device covered by this invention is intended to permit both layout and drilling operations to be done at one setting, or to eliminate the layout operation as generally undertaken. Specifically, it is intended to facilitate either drilling or centerpunching the work accurately at the desired locations.

Essentially the device consists of two heads in which holes are drilled so that they can be used as bushings or guides for drills, centerpunches, scribers or similar accessories. These heads are mounted on a member, one edge of which is accurately ground straight so as to function as a control or guide edge, or a framework of more elaborate construction can be employed if desired. Both heads can be made movable on such guides, but the preferred construction to be described covers the use of a calibrated guide bar on which one head is fixed and one head is movable as this generally is more accurate and easier to use. As described in detail below, the heads must be thick enough so that the guide holes in them will function effectively. The bottom faces of the heads must be flat, and in the same plane, so that the device can be laid flat on the work.

The guide holes in the heads obviously must be drilled so that their axes are exactly perpendicular to the work when the heads are laid down on a flat work surface. Also, the frame guide member or members, must be so made that the heads can be separated to any desired amount (within the limits of the guides) so that the axes of the guide holes will always be parallel to each other and vertical to the work. Furthermore, the holes should be drilled the same distance from the main guiding edge of the frame or calibrated bar so the line joining their centers will always be parallel to that guiding edge. An accurately calibrated rule, preferably in combination with a vernier and optical cross slides, is described as being the most adaptable and flexible means of accomplishing the desired results. A conventional mechanical vernier is suggested, but, inasmuch as an optical magnifier unit is utilized, an optical micrometer or optical vernier might well be preferred. Furthermore, the device is intended to be used with conventional Johannson type gage blocks where the use of such blocks may be indicated for any specific purpose.

Following is a detailed description of the device and of its operation.

Figure 1:
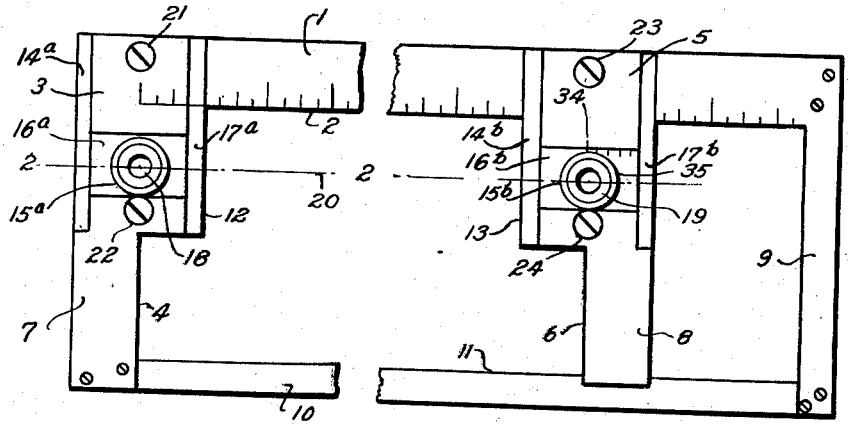
Fig. 1 is a schematic outline of the preferred general arrangement of the device.
Figure 4:
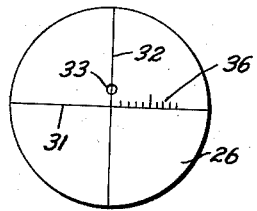
Fig. 4 shows a typical arrangement of the calibrations on a reticule such as is used on a micrometer microscope.
Figure 2:
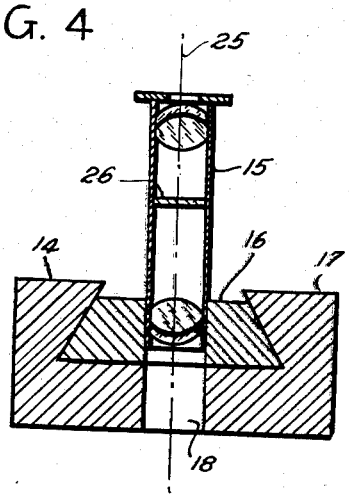
Fig. 2 is a cross section showing a preferred arrangement of the optical cross slide alignment unit as it rests on the frame or rule and centers over the guide hole.

In Fig. 1, a modified vernier type caliper is shown, in which the essential features of the device are incorporated. The main element 1 is a precision rule calibrated in the conventional manner in inches or in metric units as indicated and 2 represents the main (control) face or edge of the rule.

The fixed head 3 has a gage reference face 4 which is aligned accurately with the center of the hole 18 in the fixed head and the zero mark of the calibrated scale on the control edge 2. The gage reference face 4 is accurately at right angles to the control edge 2. The sliding head 5 has a gage reference face 6 which is in line with the hole center 19 and the zero of the vernier 34 and at right angles to the control face 2 and thus accurately parallel to the gage reference face 4.

The fixed head 1 is shown with an extension 7 and likewise the sliding head 5 is shown with an extension 8. Furthermore, the main rule element 1 and the fixed part 7 are shown braced by the end piece 9 and the bottom slide 10. The edge 11 of the bottom slide piece 10 is intended to keep the sliding head 8 in extremely precise parallellism with the fixed head so that the gaging surfaces 6 and 13 of the sliding head are always kept parallel to the fixed gaging surfaces 4 and 12 and also that the sliding head gaging surfaces 6 and 13 are always kept at right angles to the control edge 2 of the rule 1. For some purposes the endpiece 9 and the slide 10 may be considered unnecessary or undesirable. Thus Fig. 1 shows them attached with screws so that they can be removed or dispensed with. The fixed head 3 is equipped with cross-slides 14a and 17a in which a suitable optical alignment microscope 15a can be operated on a slide 16a. Similarly, the sliding head 5 is equipped with cross-slides 14b and 17b in which a suitable alignment microscope 15b can be operated on a slide 16b.

Figure 3:
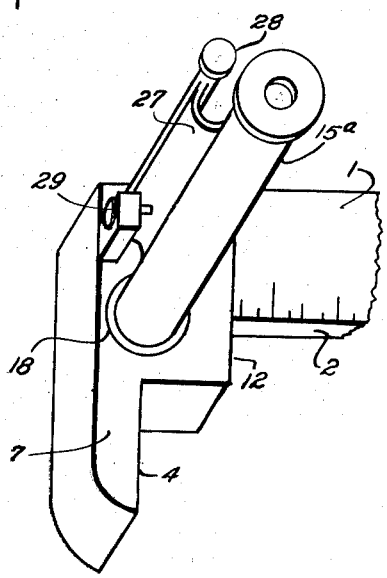
Fig. 3 shows another means of centering the optical alignment unit over the drill guide hole to allow it being pivoted out of the way when drilling.

Such an optical alignment unit 15a, mounted on the optical slide unit 16a is shown centered over the guide hole 18 of the fixed head and another optical centering unit aligned with the index mark 34 of the sliding head. The guide hole 18 in the fixed head 3 is drilled at any convenient distance below the rule face 2. This guide hole 18 is preferably located as close as possible to the lower calibrated face 2 of the rule, the distance being determined by the clearance necessary to meet the requirements of operation to be described later. In Figs. 1 and 3, the axis of this guide hole is coincident with the axis of the magnifier unit 15a over it. In any case, it is very important that the line joining the center of the guide hole 18 and the zero mark of the rule 1, be precisely at right angles to the calibrated rule face 2.

In Fig. 1, a second optical aligning unit 15b is shown centered over the guide hole 19 in the sliding head. A second hole 19 is located in the sliding head 16b below the control edge 2, and is the same distance below as is guide hole 18 in the fixed head. Necessarily, the line 20 joining the centers of the two guide holes 18 and 19 must be precisely parallel to the calibrated rule face 2 at all positions of the sliding head. As in the fixed head, the sliding head has cross-slides 14b and 17b in which an optical slide unit 16b can operate. In Fig. 1, a magnifier unit 15 is shown centered over the guide hole 19 in the sliding head. Both slides are equipped with suitable adjustable stops 21, 22, 23 and 24. These stops are for the purpose of limiting the travel of the optical slide units 16a and 16b so the optical alignment units 15a and 15b will be centered precisely with respect to the guide holes 18 and 19 when the slides 16 are registered against the stops 22 and 24 respectively. The stops 21 and 23 are not important, being necessary only to prevent the slides 16a and 16b from being removed from, or falling out of, the guides 14 and 17. While two separate optical aligning units are indicated, it is obvious that the stops 21 and 23 can be made removable without sacrificing the accuracy of the device, and that a single optical slide unit can be employed and used interchangeably on both heads. The important requisite is that the axis 25 and the cross lines 31 and 32 of the reticule 26 of the optical unit be located precisely vertically above the centers of the holes 18 and 19 in such a manner that the center 33 of the cross lines of the reticule will be centered above the work to permit operation as follows:

The application of the device involves three fundamental operations.

First: The sliding head 5 must be moved so the centers of the holes 18 and 19 are set the precise distance apart required for the work involved.

Second: The holes 18 and 19 must be located on the work so that the hole 18 is centered perpendicularly with respect to the first or locating hole, center lines, punch mark or suchlike on the work proper. At the same time the hole 19 must be located perpendicularly above the work so that the line 20 between the centers of the holes 18 and 19 is directly above the line between the locating hole or mark on the work and the hole or mark to be located on or drilled in the work.

Third: The optical slide unit by which the desired position is centered in hole 19 must be moved away from the hole 19 to permit a drill, centerpunch, scriber or suchlike operating in hole 19.

In order that such a drill, centerpunch, scriber or suchlike will drill or mark the work with requisite precision it is necessary that the device be made to operate with at least the same precision, and preferably to within closer tolerances, than called for by the tolerance specification of the work. The requirements are that the sliding head be movable so that its gaging faces are always parallel to the corresponding gaging faces of the fixed head; also, that the axes of the guide holes 18 and 19 in the heads always be centered vertically above the work when the device is laid flat on the work; and also, that the optical unit and the slides in which it operates, be made so that the cross lines of the reticule 26 of the optical unit will center vertically above the guide holes 18 and 19. The guide holes 18 and 19 are preferably hardened and bushed and the drill, center punch or other whatever is used in these holes must fit within very accurate limits so that it will be guided correctly on to the work.

There are several methods by which the holes 18 and 19 may be separated by the specified or required distance.

First, gage blocks can be placed between the faces 4 and 6 or between the faces 12 and 13. If the faces 4 are accurately in line with the center of the guide hole 18 and the faces 6 are in line with the center of the hole 19, and if the faces 4 and 6 are parallel as previously specified, then the guide holes will be centered the correct distance apart.

Second, if the face 12 is set at some predetermined distance from the center of the hole 18, and if the face 13 is set at the same predetermined distance from the center of the hole 19, it will be possible to use gage blocks between the faces 12 and 13 by allowing for double the above-mentioned predetermined offset distance. For example, if the faces 12 and 13 are each set accurately ½" from the corresponding hole centers 18 and 19, the gage blocks set between these faces would be 1" less than the specified or required dimension.

From the above it is obvious that the device can be used without the necessity of calibrations or verniers on the rule 1. Also, it is obvious that any desired combination of gaging or caliper faces can be utilized without affecting the basic principle of the device. However, because an optical centering attachment is considered a necessary and fundamental part of the device, practical or commercial considerations will probably make it desirable to calibrate the rule as described. Therefore a third method of separating the holes 18 and 19 is to set the heads by the rule and vernier calibrations. The magnifier can be used to read the vernier setting by sliding it into position (and refocusing it if necessary). A variation of this method is where an optical micrometer or optical vernier 36 is used in conjunction with the rule calibrations and no vernier is engraved on the sliding head.

A fourth and an especially accurate method is to set the device on top of a standard rule such as one for which the calibrations are known or certified to within the desired tolerances. The optical magnifier 15 thus can be used to center the holes 18 and 19 above the standard calibrations of the master rule. The same method can be used with gage blocks, centering the holes 18 and 19 above the outside or limiting edges of the gage block combination. However, gage blocks are available on which center lines are marked parallel to and within certified tolerances of one edge (or two edges). Thus, it is possible to bring together a set of gages so that two such center lines can be located a required distance apart. The device covered by the invention can then be set over such a gage combination as described above.

A convenient method of operation enables the magnifier and cross-slide unit to be dispensed with on the fixed head and used only on the sliding head. If the hole 19 of the sliding head is centered over the first or locating cross lines of the work, a hole can be drilled at that position. This hole should preferably (but not necessarily) be of the maximum diameter that can be drilled by using the hole 19 as a drilling guide. Then, if an accurately fitted pin is set in hole 18 of the fixed head, this pin can be inserted in the locating hole thus drilled in the work. Then, with the heads set the correct distance apart, the device can be pivoted by means of the pin in the hole 18 of the fixed head, in an arc centered with respect to the initial locating hole in the work. Thus, the optical magnifier 15b centered above hole 19 can center this hole above the work, the second hole drilled the correct distance from the first hole and the operation repeated. This procedure of course assumes that lines are first drawn or scribed on the work to pre-establish the line connecting the centers of the desired work holes. If necessary, a scriber point can be used in hole 19 so that cross lines may be scribed to mark a desired location of known distances from two established holes or locations. Another possible variation of the device is where the guide hole 18 in the fixed head is not in line with the zero mark of the calibration nor in line with the caliper face or faces of the fixed head. Likewise the guide hole in the sliding head can also be "off center." Such an arrangement is not recommended as it normally involves allowing for the amount of off-center distance involve. For some cases, where the caliper faces must meet, it may be considered preferable to make such an allowance for the guide holes being displaced.

Finally, while a sliding type magnifier unit is described as being preferable, other means can be employed for centering the magnifier over the guide holes and moving it out of the way for drilling. For example, in Fig. 3 the magnifier 15 is shown mounted on an arm 27 of convenient length and the arm 27 pivoted on a vertical stud 28 located on the head. The pivot 28 does not have to be set vertically; it can be set horizontally if preferred, to act as a hinge. It will be necessary to provide suitable means such as adjustable limit stops 29 to limit the arc of travel of the magnifier arm and thus center it over the guide hole 18. Then, swinging the magnifier around provides clearance so that a drill, center-punch, scriber or suchlike can be operated in the guide hole.

Finally, the device can be used to check the accuracy of the laying out of center punch marks and also of the spacing apart of holes after they have been drilled. To check the spacing of center punch marks, the magnifier unit 15a is set over the hole 18 and then centered over the first center punch mark. The movable head 5 is moved, with the magnifier 15b centered over the hole 19, until the magnifier 15b is centered over the second center punch mark. Then the magnifier unit 15b is moved over the scale 2 and the reading taken. Or as an alternative, the device can be set over gage blocks or suchlike, and checked.

Further modifications can be made to the device as described without affecting the basic principles involved but it is believed the essential applications of the invention are sufficiently obvious to those skilled in the art that further detailed descriptions of possible modifications are superfluous.

Similarly, in checking the spacing of holes already drilled, a similar procedure is used except that readings are taken from the edges of the holes.

A preferred procedure is to set the magnifier 15a over the hole 18 and center on the left hand edge of the first hole. Then the diameter of the first hole is determined. Then the distance from the left hand (or right hand) edge of the first hole to the left hand edge of the second hole is determined and then to the right hand edge of the second hole is determined. By subtraction, the distance apart of the hole centers can be established. Obviously, care must be taken that the readings are made across the maximum diameters of the holes or in other words along the line joining their centers.

I claim:

1. A layout and hole locating and checking device consisting of a frame of one or more members of which one edge of one of the members functions as a control or guide edge and on which frame is mounted a fixed head and a movable head arranged so as to permit the heads to be controllably separated to very precise measurements, said heads having accurately bored guide holes in them arranged so that the centers of said guide holes are the same distance away from the said control guide edge at any position of the movable head and with the bottom of the device being flat so that the axes of said guide holes are exactly vertical to the work at any setting when the device is laid on a flat work surface, said heads also being made so the axes of the guide holes in them remain exactly parallel to each other at any setting, one or both heads also being equipped with an optical alignment unit fitted with a centering reticule and with the axis of said optical aligning unit being exactly vertical to the work at all settings when the device is laid on a flat work surface, said control edge being calibrated so the zero of the scale on it is in line with the center of the guide hole in the fixed head and with the movable head having an index mark or the zero of a vernier calibration on it in line with the center of the guide hole in the movable head, said optical aligning unit on the fixed head being movably arranged so that the said reticule can be centered over the center of the guide hole in that head and with the optical aligning unit on the movable head being movably arranged to center with respect to the guide hole in the movable head at one setting and with the index mark or vernier zero on the movable head at the other setting in such a way as to permit accurate reading of the scale calibration on the control edge and thus the distance apart by which the guide holes are set, both optical aligning units being movable sufficiently clear of the said guide holes to permit a drill, scriber, centerpunch or suchlike device to operate vertically with respect to the work when guided by said guide holes.

2. A layout or hole locating and checking device consisting of a main member accurately calibrated with a scale starting with a conventional zero mark and with the edge of said member which is adjacent said calibration being finished accurately straight so as to act as a guide or control edge, on said member being mounted a fixed head and a movable head, the movable head having a vernier scale adjacent to said main scale, said vernier scale starting with a conventional zero mark, said heads both having accurately bored guide holes in them arranged so the centers of said guide holes are exactly the same distance away from said control edge at all positions of the movable head and with the bottom of the device being flat so that the axes of said guide holes are always exactly vertical to a flat work surface when the device is laid on such a flat surface, the fixed head having a gage reference surface the plane of which passes through the center of the guide hole in the fixed head and through the zero of the main scale and which plane is at right angles to said control edge, the movable head also having a gage reference surface the plane of which passes through the center of the guide hole in the movable head and through the zero of the vernier scale on that head and which plane is also at right angles to said control edge at all settings of the movable head and thus parallel to the gage reference surface on the fixed head at all positions, one or both heads being equipped with an optical alignment unit fitted with a centering reticule and with the axis of said optical aligning unit being exactly vertical to the work at all settings when the device is laid on a flat work surface, the optical aligning unit on the fixed head being movably arranged so that its reticule can be centered over the center of the guide hole in the fixed head and with the optical aligning unit on the movable head being movably arranged to center with respect to the guide hole in that head at one setting and to align over the zero of said vernier and the adjacent calibration on the main scale at the other setting so as to permit accurate determination of the setting apart of the centers of the guide holes in said heads, both optical aligning units being movable sufficiently clear of said guide holes to permit a drill, scriber, centerpunch or suchlike device to operate vertically with respect to the work when guided by said guide holes.

3. A layout or hole locating device as in claim 1, in which each head is equipped with caliper faces, so that the said faces are parallel to each other and at right angles to the said control edge of the frame and in line with the centers of the guide hole in each head, said caliper surfaces being arranged so that standard gage blocks may be inserted between them to set the said guide holes at any desired distance apart within the limits of the device, said setting being of an accuracy corresponding to the accuracy of the gage blocks used.

4. A layout or hole locating device as in claim 2, in which each head is equipped with caliper faces, so that the said faces are parallel to each other and at right angles to the said control edge of the frame and in line with the centers of the guide hole in each head, said caliper surfaces being arranged so that standard gage blocks may be inserted between them to set the said guide holes at any desired distance apart within the limits of the device, said setting being of an accuracy corresponding to the accuracy of the gage blocks used.

5. A layout or hole locating device as in claim 1, except that the magnifier unit be of the calibrated micrometer eyepiece type, preferably equipped with an optical vernier instead of a vernier being engraved on the sliding head.

6. A layout or hole locating device as in claim 2, except that the magnifier unit be of the calibrated micrometer eyepiece type, preferably equipped with an optical vernier instead of a vernier being engraved on the sliding head.

7. A layout or hole locating device as in claim 1, in which each head is equipped with gage reference faces, so that the said faces are parallel to each other and at right angles to the said control edge of the frame and at a controlled distance from said centers, said gage reference faces being arranged so that standard gage blocks may be inserted between them to set the said guide holes at any desired distance apart within the limits of the device, said setting being of an accuracy corresponding to the accuracy of the gage blocks used.

8. A layout or hole locating device as in claim 2, in which each head is equipped with gage reference faces, so that the said faces are parallel to each other and at right angles to the said control edge of the frame and at a controlled distance from said centers, said gage reference faces being arranged so that standard gage blocks may be inserted between them to set the said guide holes at any desired distance apart within the limits of the device, said setting being of an accuracy corresponding to the accuracy of the gage blocks used.

REGINALD FAWN MITCHELL.

REFERENCES CITED

The following references are of record in the file of this patent:

UNITED STATES PATENTS

| Number | Name | Date |
|---|---|---|
| 759,233 | Bond | May 10, 1904 |
| 893,562 | Ash | July 14, 1908 |
| 1,269,811 | Heritage | June 18, 1918 |
| 1,321,312 | Jooss | Nov. 11, 1919 |
| 1,424,941 | Pirwitz | Aug. 8, 1922 |
| 1,630,659 | Hacker | May 31, 1927 |
| 1,800,209 | Christopherson | Apr. 14, 1931 |
| 1,871,178 | Hudson | Aug. 9, 1932 |
| 2,237,515 | Williams | Apr. 8, 1941 |
| 2,339,467 | Eckhard et al. | Jan. 18, 1944 |

FOREIGN PATENTS

| Number | Country | Date |
|---|---|---|
| 58,717 | Austria | Apr. 25, 1913 |
| 83,702 | Switzerland | June 1, 1920 |